(No Model.)
I. T. HARDY.
Lubricator.
No. 240,021. Patented April 12, 1881.
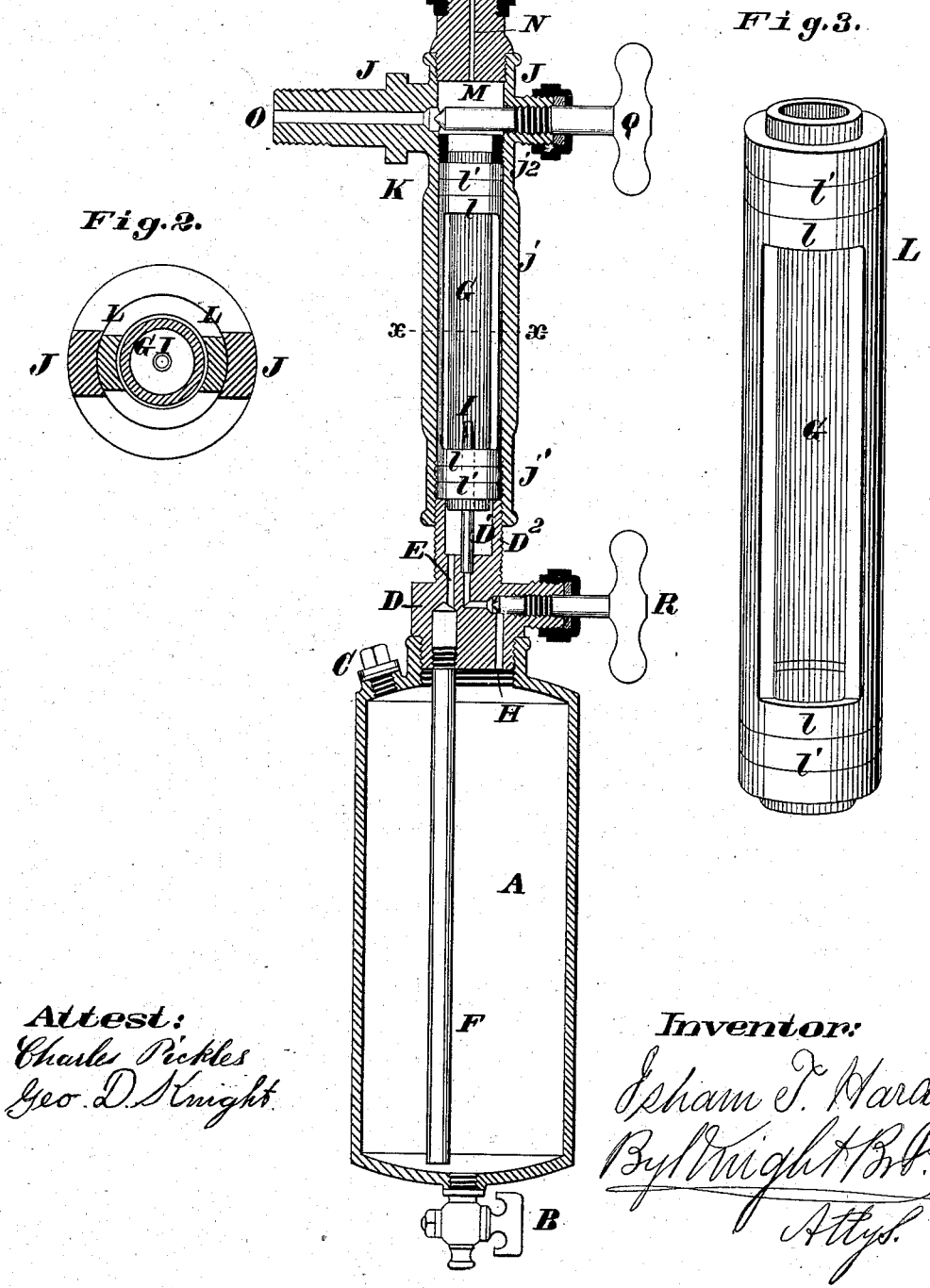
Attest:
Charles Pickles
Geo. D. Knight
Inventor:
Isham T. Hardy
By Knight Bro.
Attys.

UNITED STATES PATENT OFFICE.

ISHAM T. HARDY, OF ST. LOUIS, MISSOURI.

LUBRICATOR.

SPECIFICATION forming part of Letters Patent No. 240,021, dated April 12, 1881.

Application filed December 28, 1880. (No model.)

*To all whom it may concern:*

Be it known that I, ISHAM T. HARDY, of the city of St. Louis, in the State of Missouri, have invented a certain new and useful Improvement in Lubricators, of which the following is a specification, reference being had to the accompanying drawings.

My invention belongs to that class of lubricators which are connected to the steam-pipe of a steam-engine to automatically supply oil to the interior of the pipe, to be carried into the steam-chest with the steam.

Figure 1 is chiefly an axial section embracing all the novel features, the glass tube and its surrounding frame being in side view. Fig. 2 is an enlarged section at $x$ $x$. Fig. 3 is an enlarged perspective view of the glass tube, frame, and packing-rings.

A is the oil-vessel or tank, having at the lower end a cock, B, for the discharge of the water of condensation, and having at the top an orifice closed by a screw-cap or plug, C, through which the oil is poured in to fill the tank.

D is a head screwed into the top of the tank. E is a vertical passage extending through the head, and ending in a pipe, F, extending to near the bottom of the tank, to convey the water of condensation down to that part. The upper end of the water-passage E is in communication with the interior of the glass tube G, at its lower end, so that the water from steam condensing in and above the glass tube will pass down to the lower part of the tank A.

The head D has an oil-passage, H, extending through it, opening at the lower end into the top of the tank, (chamber,) and ending at the top in a pipe or nozzle, I, extending upward some distance into the glass tube, so that the oil is delivered from the upper end of the nozzle above the water-chamber D' in head D. The head D has a screw-neck, $D^2$, extending upward and screwing into a socket, $j'$, forming the lower end of frame or open socket $j$, that extends downward from the casting J. The casting J has a screw-socket, $j^2$, in which screws a ring, K, which forms the upper bearing of the glass tube G.

In place of the screw-ring K the bearing may be formed in the solid metal.

The glass tube is inserted in a frame, L, having at each end a socket, $l$, in which the glass fits easily, the ends of the glass extending beyond the sockets $l$, to receive the packing-rings $l'$, of rubber or other suitable substance. The lower end of the glass enters the chamber D', and its upper end fits the ring K, so that when the neck $D^2$ is screwed into the socket $j'$ the packing-rings $l'$ are compressed between the ends of the frame L and the bearings $D^2$ and K, respectively, and a tight joint is made with the ends of the glass tube. The upper end of the glass tube communicates with a chamber, M, entered by two steam-passages, N and O. The passage N communicates with a steam-pipe, N', whose upper end (not seen) is in communication with an upright steam-supply pipe of a steam-engine. The steam-passage O communicates with the same steam-pipe at a point below and nearer to the engine than that at which the pipe N' communicates, so that there is a constant current of steam down the pipe N' and passage N to the chamber M, and out of said chamber through the passage O back to the steam-pipe, carrying with it the oil which is afloat on the water in the chamber M. A part of the steam will become condensed in the pipe N', and the water of condensation will collect in the chamber M and fill the glass tube G, and gradually fill up the tank A, expelling the oil through the passage H and nozzle I into the glass tube G, in which it rises in drops to the chamber M, and is carried by the steam-current to the steam-chest, as before explained.

I would here remark that I do not show an ordinary steam-pipe and steam-chest, because I claim herein no novelty in the described manner of attaching a lubricator to a steam-pipe, as this application of lubricators is well known.

P is a valve or cock to close the steam-pipe N', and Q is a valve to close the steam-passage O. These valves are wide open when the apparatus is in operation; but they are closed to cut off the steam when filling the tank with oil.

R is a valve by which the flow of oil is regulated, sufficient water of condensation flowing down from the chamber M to take the place of the oil expelled. The surplus water of condensation flows through the passage O with the steam.

I claim as my invention—

1. The head D, formed with vertical water-passage E, descending water-pipe F, independent oil-passage H, and conducting oil-nozzle I, in combination with the tank A and glass tube G, the said pipe F descending to near the bottom of the said tank, and the said nozzle I entering the said tube, as set forth.

2. The regulating-valve R, in combination with the head D, having independent water and oil passages E H, descending water-pipe F, oil-nozzle I, tank A, and glass tube G, as set forth.

3. The combination of glass tube G, inclosing-frame L, having sockets $l\ l$, and open at the sides, compressible securing-rings $l'\ l'$ at each end, bearing K, adjustable bearing $D^2$, and open socket $j$, as set forth.

ISHAM T. HARDY.

Witnesses:
SAML. KNIGHT,
GEO. D. KNIGHT.